United States Patent
Smith et al.

[11] Patent Number: 5,352,421
[45] Date of Patent: * Oct. 4, 1994

[54] METHOD AND APPARATUS FOR EFFECTING GAS-LIQUID CONTACT

[75] Inventors: James W. Smith, Toronto; David T. R. Ellenor, Scarborough; John N. Harbinson, Aurora, all of Canada

[73] Assignees: University of Toronto Innovations Foundation, Toronto; Apollo Environmental Systems Corp., Willowdale, both of Canada

[*] Notice: The portion of the term of this patent subsequent to Dec. 29, 2009 has been disclaimed.

[21] Appl. No.: 863,720

[22] Filed: Apr. 3, 1992

Related U.S. Application Data

[63] Continuation-in-part of Ser. No. 622,485, Dec. 5, 1990, Pat. No. 5,174,973, which is a continuation-in-part of Ser. No. 582,423, Sep. 14, 1990, abandoned, which is a continuation-in-part of Ser. No. 446,776, Dec. 6, 1989, abandoned.

[30] Foreign Application Priority Data

Dec. 5, 1989 [CA] Canada ................... 2004652
May 2, 1990 [GB] United Kingdom ................. 9002462

[51] Int. Cl.$^5$ ............ C01B 17/16; C01B 31/20; C01B 17/20; B05B 7/10
[52] U.S. Cl. .................. 423/220; 423/224; 423/226; 423/576.4; 423/576.6; 423/576.7; 210/221.1; 210/704; 210/758; 261/84; 422/168
[58] Field of Search .......... 423/220, 222, 224, 226, 423/227, 228, 574 L, 576.2, 576.5, 576.6, 576.8; 216/703, 704, 705, 706, 758, 222.1, 222.2; 261/84, 85, 86, 87; 420/576.4, 576.6, 576.7; 422/168

[56] References Cited

U.S. PATENT DOCUMENTS 2,274,658 3/1942 Booth .................... 210/53
(List continued on next page.)

FOREIGN PATENT DOCUMENTS 1212819 10/1986 Canada .

OTHER PUBLICATIONS

"Development of Self-Inducing Dispenser for Gas-/Liquid and Liquid/Liquid Systems" by Koen et al, Processing of the Second European Conference on Mixing, Mar. 30th–Apr. 1st, 1977.

(List continued on next page.)

*Primary Examiner*—Gary P. Straub
*Attorney, Agent, or Firm*—Sim & McBurney

[57] ABSTRACT

Components, usually but not exclusively gaseous components, are removed in a liquid medium from gas streams and chemically converted into an insoluble phase or physically removed. Specifically, hydrogen sulfide may be removed from gas streams by oxidation in aqueous chelated transition metal solution in a modified agitated flotation cell. The same principle may be employed with other procedures in which a gaseous phase is dispersed in a liquid phase to effect an interaction between components present in such phases. A gas-liquid contact apparatus, generally a combined chemical reactor and solid product separation device, comprising such modified agitated flotation cell also is described. In order to effect efficient mass transfer and rapid reaction, gas bubbles containing hydrogen sulfide and oxygen are formed by rotating an impeller at a blade tip velocity of at least about 350 in/sec. to achieve the required shear. To assist in the reaction, a surrounding shroud has a plurality of openings, generally of aspect ratio of approximately 1, of equal diameter and arranged in uniform pattern, such as to provide a gas flow therethrough less than about 0.02 lb/min/opening in the shroud. In general, the gas velocity index of gas through the openings in the shroud is at least about 18 per second per opening, preferably at least about 24 per second per opening. Each of the openings has an area corresponding to an equivalent diameter less than about one inch.

9 Claims, 3 Drawing Sheets

U.S. PATENT DOCUMENTS

| | | | |
|---|---|---|---|
| 2,294,827 | 9/1942 | Booth | 183/2.5 |
| 2,659,691 | 11/1953 | Gislon et al. | 208/207 |
| 3,273,865 | 9/1966 | White | 259/108 |
| 3,341,450 | 9/1967 | Ciabattari et al. | 210/758 |
| 3,647,069 | 5/1972 | Bailey | 210/221.1 |
| 3,796,628 | 3/1974 | Sew | 210/758 |
| 3,911,093 | 10/1975 | Sherif et al. | 423/574 |
| 3,915,391 | 10/1975 | Mercade | 209/166 |
| 3,925,230 | 12/1975 | Koeptle et al. | 252/136 |
| 3,979,282 | 9/1976 | Cundy | 209/166 |
| 3,993,563 | 11/1976 | Degner | 210/221 M |
| 4,036,942 | 7/1977 | Sibeud et al. | 423/226 |
| 4,442,083 | 4/1984 | Canales et al. | 423/567 R |
| 4,452,766 | 6/1984 | Pike | 423/421 |
| 4,525,338 | 6/1985 | Klee, Jr. | 423/576.2 |
| 4,534,952 | 8/1985 | Rapson et al. | 210/754 |
| 4,552,747 | 11/1985 | Goar | 423/574 R |
| 4,576,708 | 3/1986 | Oko et al. | 208/408 |
| 4,618,427 | 10/1986 | Vewas | 210/758 |
| 4,648,973 | 3/1987 | Hultholm et al. | 210/758 |
| 4,666,611 | 5/1987 | Kaelin | 210/758 |
| 4,683,062 | 7/1987 | Krovak et al. | 210/617 |
| 4,737,272 | 4/1988 | Szatkowskietal | 210/703 |
| 4,789,469 | 12/1988 | Cvitas et al. | 210/150 |
| 4,808,385 | 2/1988 | Grinstead | 423/228 |
| 4,919,914 | 4/1990 | Smith et al. | 423/576.2 |
| 4,959,183 | 9/1990 | Jameson | 209/169 |

OTHER PUBLICATIONS

Chapter entitled "Outokumpu Flotation Machines" by K. Fallenius, in Chapter 29 of Flotation, ed. M. C. Fuerstenau, no date.

AIMM, PE Inc. New York 1976; and Chapter entitled "Flotation Machines and Equipment" in Flotation Agents and Processes, Chemical Technology Review #172, M. M. Ranney, Editor, 1980.

METHOD AND APPARATUS FOR EFFECTING GAS-LIQUID CONTACT

REFERENCE TO RELATED APPLICATION

This application is a continuation-in-part of U.S. patent application Ser. No. 622,485 filed Dec. 5, 1990 (now U.S. Pat. No. 5,174,973) which itself is a continuation-in-part of U.S. patent application Ser. No. 582,423 filed Sep. 14, 1990 (now abandoned) which itself is a continuation-in-part of U.S. patent application Ser. No. 446,776 filed Dec. 6, 1989 (now abandoned).

FIELD OF INVENTION

The present invention relates to method and apparatus for effecting gas-liquid contacting, for example, for the removal of components from gas streams, in particular by chemical conversion of gaseous components to an insoluble phase while in contact with a liquid phase or slurry, or for the removal of components from a liquid phase.

BACKGROUND TO THE INVENTION

Procedures for effecting contact between a gas phase and a liquid phase have been devised for a variety of purposes, for example, to reserve a component from the gas or liquid phase. In this regard, many gas streams contain components which are undesirable and which need to be removed from the gas stream prior to its discharge to the atmosphere or further processing. One such gaseous component is hydrogen sulfide, while another such component is sulfur dioxide.

Hydrogen sulfide occurs in varying quantities in many gas streams, for example, in sour natural gas streams and in tail gas streams from various industrial operations. Hydrogen sulfide is odiferous, highly toxic and a catalyst poison for many reactions and hence it is desirable and often necessary to remove hydrogen sulfide from such gas streams.

There exist several commercial processes for effecting hydrogen sulfide removal. These include processes, such as absorption in solvents, in which the hydrogen sulfide first is removed as such and then converted into elemental sulfur in a second distinct step, such as in a Claus plant. Such commercial processes also include liquid phase oxidation processes, such as Stretford, LO-CAT, Unisulf, Sulferox, Hiperion and others, whereby the hydrogen sulfide removal and conversion to elemental sulfur normally are effected in reaction and regeneration steps.

In Canadian Patent No. 1,212,819 and its corresponding U.S. Pat. No. 4,919,914, the disclosure of which is incorporated herein by reference, there is described a process for the removal of hydrogen sulfide from gas streams by oxidation of the hydrogen sulfide at a submerged location in an agitated flotation cell in intimate contact with an iron chelate solution and flotation of sulfur particles produced in the oxidation from the iron chelate solution by hydrogen sulfide-depleted gas bubbles.

The combustion of sulfur-containing carbonaceous fuels, such as fuel oil, fuel gas, petroleum coke and coal, as well as other processes, produces an effluent gas stream containing sulfur dioxide. The discharge of such sulfur dioxide-containing gas streams to the atmosphere has lead to the incidence of the phenomenon of "acid rain", which is harmful to a variety of vegetation and other life forms. Various proposals have been made to decrease such emissions.

A search in the facilities of the United States Patent and Trademark Office with respect to gas-liquid contacting procedures has revealed the following U.S. patents as the most relevant to the present invention:

| | |
|---|---|
| U.S. Pat. No. 2,274,658 | U.S. Pat. No. 2,294,827 |
| U.S. Pat. No. 3,273,865 | U.S. Pat. No. 4,683,062 |
| U.S. Pat. No. 4,789,469 | |

U.S. Pat. Nos. 2,274,658 and 2,294,827 (Booth) describe the use of an impeller to draw gas into a liquid medium and to disperse the gas as bubbles in the liquid medium for the purpose of removing dissolved gaseous materials and suspended impurities from the liquid medium, particularly a waste stream from rayon spinning, by the agitation and aeration caused by distribution of the gas bubbles by the impeller.

The suspended solids are removed from the liquid phase by froth flotation while the dissolved gases are stripped out of the liquid phase. The process described in this prior art is concerned with contacting liquid media in a vessel for the purpose of removing components from the liquid phase by the physical actions of stripping and flotation.

These references contain no discussion or suggestion for removal of components from gas streams by introduction to a liquid phase or the treatment of components dissolved or suspended in the liquid phase by chemical interaction with components of the gas phase. In addition, the references do not describe any critical combination of impeller—shroud parameters for effecting such removal, as required herein.

U.S. Pat. No. 3,273,865 describes an aerator for sewage treatment. A high speed impeller in the form of a stack of flat discs forms a vortex in the liquid to draw air into the aqueous phase and circulate the aqueous phase. As in the case of the two Booth references, this prior art does not describe or suggest an impeller-shroud combination for effecting the removal of components from a liquid phase or gaseous phase, as required herein.

U.S. Pat. No. 4,683,062 describes a perforated rotatable body structure which enables liquid/solid contact to occur to effect biocatalytical reactions. This reference does not describe an arrangement in which gas-liquid contact is effected.

U.S. Pat. No. 4,789,469 describes the employment of a series of rotating plates to introduce gases to or remove gases from liquids. There is no description or suggestion of an impeller-shroud combination, as required herein.

Many other gas-liquid contactors and flotation devices are described in the literature, for example:

(a) "Development of Self-Inducing Dispenser for Gas/Liquid and Liquid/Liquid Systems" by Koen et al, Proceeding of the Second European Conference on Mixing, Mar. 30, 1977–Apr. 1, 1977;

(b) Chapter entitled "Outokumpu Flotation Machines" by K. Fallenius, in Chapter 29 of "Flotation", ed. M. C. Fuerstenau, AIMM, PE Inc, New York 1976; and (c) Chapter entitled "Flotation Machines and Equipment" in "Flotation Agents and Processes, Chemical Technology Review #172", M. M. Ranney, Editor, 1980.

However, none of this prior art describes the impeller-shroud structure used herein.

SUMMARY OF THE INVENTION

In the present invention, a novel procedure is provided for effecting gas-liquid contact between a gas and a liquid which employs a rotatory impeller and shroud combination operated under specific conditions to effect rapid mass transfer between gaseous and liquid phases and thereby achieve an enhanced efficiency of removal of a component from the gas or liquid phase or transfer of a component one to the other by chemical reaction, absorption or desorption.

In one aspect of the present invention, there is provided a method for the distribution of a gaseous phase in a liquid phase using a rotary impeller comprising a plurality of blades at a submerged location in the liquid phase surrounded by a shroud through which are formed a plurality of openings.

The impeller is rotated about a substantially vertical axis at the submerged location within the liquid phase at a blade tip velocity of at least about 350 in/sec, preferably about 500 to about 700 in/sec, and draws liquid phase to the interior of the shroud.

A gaseous phase is fed to the submerged location and the shear forces between the impeller blades and the plurality of openings in the shroud distributes the gaseous phase in the liquid phase as fine bubbles to the interior of the shroud and to form a gas-liquid mixture of fine bubbles of the gaseous phase in liquid phase contained within the shroud and to effect intimate contact of gas and liquid phases at the submerged location and initiate rapid mass transfer.

The gas-liquid mixture of fine bubbles of gaseous phase and liquid phase flows from the interior of the shroud through and in contact with the openings therein to external of the shroud at a gas velocity index (GVI) of at least about 18 per second per opening, preferably at least about 24 per second per opening which causes further shearing of the fine gas bubbles and further intimate contact of gaseous phase and liquid phase.

The gas velocity index (GVI) is the ratio of the linear velocity (V) of the gaseous phase through each opening and the equivalent diameter (d) of the opening, as determined by the expression:

$$GVI = V/d$$

where d is determined for each opening by the expression:

$$d = 4A/P$$

where A is the area of the opening and P is the length of the perimeter of the opening.

By employing the unique combination of impeller blade tip velocity and gas flow index through the shroud openings as set forth herein, a very efficient distribution of gas and liquid phases is effected, such that rapid and efficient mass transfer occurs. As noted above and as described in detail below, this result may be employed in a variety of applications where such rapid and efficient mass transfer is desirable and can be effected in the region of the shroud, as opposed to the body of the liquid medium, as in the case of mineral separation.

Such procedures include:
(a) the removal of gaseous components from gas streams, in particular by chemical conversion of such gaseous components or by physical dissolution of such gaseous components,
(b) the removal of dissolved components from a liquid phase, in particular by chemical conversion of the dissolved components by gaseous components of the gas stream or physical desorption of dissolved components, and
(c) the treatment of suspended components in the liquid phase, in particular by chemical treatment with gaseous components of the gas stream.

The enhanced efficiency which is achieved in the present invention results from dispersion of fine bubbles of gas phase in the liquid phase, formation of an intimate mixture of gaseous and liquid phases confined within the shroud and passage of the intimate mixture through and in contact with the shroud, such as to achieve rapid mass transfer of interactive components one to the other.

Also as discussed in more detail below, the equipment used in the method of the present invention, has a superficial similarity to flotation equipment generally employed for the separation of suspended solid components from a liquid phase. However, the present invention employs equipment modifications and operating parameter modifications not employed in such flotation operations.

The present invention, in another aspect, provides a novel gas-liquid contact apparatus which is useful for effecting the method broadly described above and in more detail below. Such apparatus comprises tank means, inlet gas manifold means for feeding at least one gas stream through an inlet to the tank means for holding a liquid phase and standpipe means communicating with the inlet and extending downwardly within the tank to permit a gas to be fed to a submerged location in the liquid phase.

Impeller means comprising a plurality of blades is located towards the lower end of said standpipe means and hence at the submerged location and is mounted to a shaft for rotation about a generally vertical axis by drive means. Such drive means may comprise an external drive motor or an in-line impeller driven by the pressure of the gas stream fed to the apparatus. Shroud means surrounds the impeller means and has a plurality of openings extending through the wall of the shroud means.

Each of the openings through the shroud means has an equivalent diameter (d) such that the ratio of the equivalent diameter to the diameter of the impeller means is less than about 0.15. The equivalent diameter for each opening is determined by the expression:

$$d = 4A/P$$

where A is the area of the opening and P is the length of the perimeter of the opening.

Preferably, the equivalent diameter (d) for each opening is less than about 1 inch and the openings are arranged to permit the flow of gas and liquid phase through the shroud openings at a gas velocity index (GVI) of at least about 18 per second per opening in the shroud.

The shroud construction comprises an additional aspect of the invention.

GENERAL DESCRIPTION OF INVENTION

Figure 1:
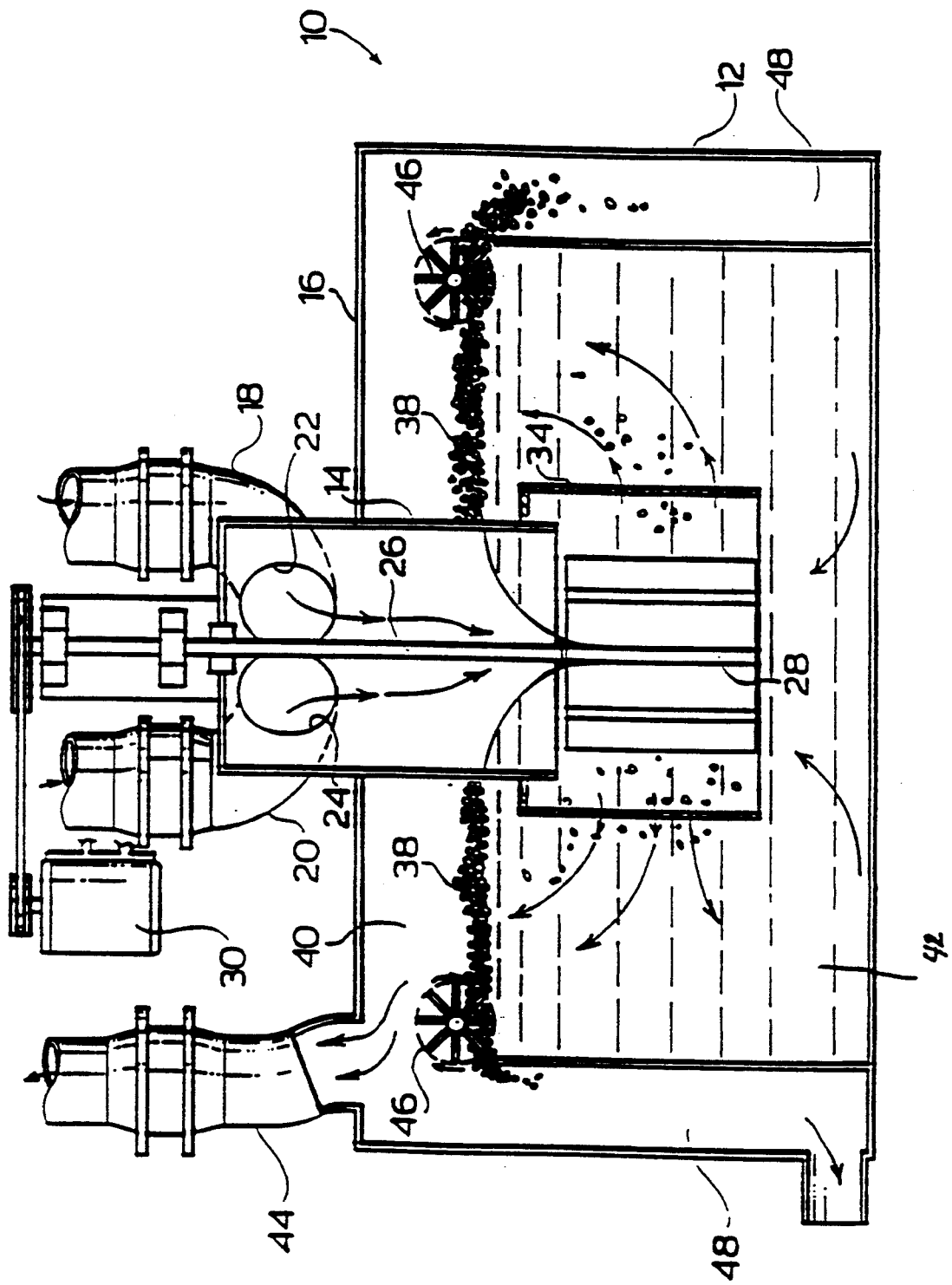
FIG. 1 is an upright sectional view of a novel gas-liquid contact apparatus provided in accordance with one embodiment of the invention.

The present invention is directed, in one embodiment, towards improving the process of the prior Canadian Patent No. 1,212,819 by modification to the physical structure of the agitated flotation cell employed therein and of the operating conditions employed therein, so as to improve the overall efficiency of hydrogen sulfide removal and thereby decrease operating and capital costs, while, at the same time, retaining a high efficiency for removal of hydrogen sulfide from the gas stream.

However, the present invention is not restricted to effecting the removal of hydrogen sulfide from gas streams by oxidation, but rather the present invention is generally applicable to the removal of gas, liquid and-/or solid components from a gas stream by chemical reaction, and more broadly includes the removal of gaseous phase components in any physical form as well as sensible heat from a gas stream by gas-liquid contact.

In one embodiment of the present invention, a gas stream is brought into contact with a liquid phase in such a manner that there is efficient contact of the gas stream with the liquid phase for the purpose of removing components from the gas stream, particularly an efficient contact of gas and liquid is carried out for the purpose of effecting a reaction which removes a component of the gas and converts that component to an insoluble phase while in contact with the liquid phase. However, the removal of a component may be effected by a physical separation technique, rather than a chemical reaction. These operations contrast markedly with the conventional objective of the design of a flotation cell, which is to separate a slurry or suspension into a concentrate and a gangue or barren stream in minerals beneficiation. A component is not specifically removed from a gas stream during the latter operations, nor is there an interaction of gaseous phase and liquid phase components. The distribution of the gas phase in the liquid phase in such flotation processes is for the sole purpose of physical removal of the gas solid phase by flotation by gaseous bubbles.

There are a variety of processes to which the principles of the present invention can be applied. The processes may involve reaction of a gaseous component of the gas stream with another gaseous species in a liquid phase, usually an aqueous phase, often an aqueous catalyst system.

One example of such a process is the oxidative removal of hydrogen sulfide from gas streams in contact with an aqueous transition metal chelate system to form sulfur particles, as described generally in the above-mentioned Canadian Patent No. 1,212,819.

Another example of such a process is in the oxidative removal of mercaptans from gas streams in contact with a suitable chemical reaction system to form immiscible liquid disulfides.

A further example of such a process is the oxidative removal of hydrogen sulfide from gas streams using chlorine in contact with an aqueous sodium hydroxide solution, to form sodium sulphate, which, after first saturating the solution, precipitates from the aqueous phase.

An additional example of such a process is the removal of sulfur dioxide from gas streams by the so-called "Wackenroder's" reaction by contacting hydrogen sulfide with an aqueous phase in which the sulfur dioxide is initially absorbed, to form sulfur particles. This process is described in U.S. Pat. Nos. 3,911,093 and 4,442,083. The procedure of the present invention also may be employed to effect the removal of sulfur dioxide from a gas stream into an absorbing medium in an additional gas-liquid contact vessel.

A further example of such a process is the removal of sulfur dioxide from gas streams by reaction with an aqueous alkaline material.

The term "insoluble phase" as used herein, therefore, encompasses a solid insoluble phase, an immiscible liquid phase and a component which becomes insoluble when reaching its solubility limit in the liquid medium after start up.

The component removed from the gas stream in this embodiment of the invention usually is a gaseous component but the present invention includes the removal of other components from the gas stream, such as particulate material or dispersed liquid droplets.

For example, the present invention may be employed to remove solid particles or liquid droplets from a gas stream, i.e. aerosol droplets, such as by scrubbing with a suitable liquid medium. Similarly, moisture may be removed from a gas stream, such as by scrubbing with a suitable hydrophilic organic liquid, such as glycol.

A wide range of particle sizes from near molecular size through Aikin nuclei to visible may be removed from a gas stream by the well understood mechanisms of diffusion, interception, impaction and capture in a foam layer using the method described herein.

More than one component of any type and components of two or more types may be removed simultaneously or sequentially from the gas stream. In addition, a single component may be removed in two or more sequential operations.

The present invention also may be employed to remove sensible heat (or thermal energy) from a gas stream by contacting the gas stream with a suitable liquid phase of lower temperature to effect heat exchange. Similarly, sensible heat may be removed by evaporation of a liquid phase.

Accordingly, in one preferred aspect of the present invention, there is provided a method of removing a component from a gas stream containing the same in a liquid phase, comprising a plurality of steps. A component-containing gas stream is fed to an enclosed gas-liquid contact zone in which is located a liquid medium.

An impeller comprising a plurality of blades is rotated about a generally vertical axis at a submerged location in the liquid medium so as to induce flow of the gas stream along a generally vertical flow path from external to the gas-liquid contact zone to the submerged location.

The impeller is surrounded by a shroud through which are formed a plurality of openings, generally within a preferred range of impeller to shroud diameter ratios found in flotation cells. The impeller is rotated at a speed corresponding to a blade tip velocity of at least about 350 in/sec., preferably about 500 to about 700 in/sec., so as to generate sufficient shear forces between the impeller blades and the plurality of openings in the shroud to distribute the gas stream as fine gas bubbles in the liquid medium to the interior of the shroud, thereby achieving intimate contact of the component and liquid medium at the submerged location so as to form a gas-liquid mixture of fine gas bubbles in said liquid medium contained within the shroud and to effect removal of the component from the gas stream into the liquid medium.

The gas-liquid mixture of fine gas bubbles and liquid medium flows from the interior of the shroud through and in contact with the openings therein into the body of the liquid medium external to the shroud at a gas velocity index (GVI) at approximately atmospheric pressure of at least about 18 per second per opening, preferably at least about 24 per second per opening, so as to effect further shearing of the fine gas bubbles and further intimate contact of the gas stream and the liquid medium, whereby any removal of component not effected in the interior of the shroud is completed in the region of the liquid medium adjacent to the exterior of the shroud.

In this embodiment, as well as the other embodiments of the invention, the gas velocity index (GVI) more preferably is at least about 30 per second per opening, and may range to very high values, such as up to about 400 per second per opening, and often is in excess of about 100 per second per opening.

As mentioned above, the gas velocity index (GVI) per opening is the ratio of linear velocity of the gas phase through each opening and the equivalent diameter of the opening, as determined by the relationship:

$$GVI = \frac{\text{Linear Velocity through the Opening (in/sec)}}{\text{Equivalent diameter (in)}} = \frac{V}{d}$$

where the equivalent diameter (d) is determined by the relationship:

$$d = \frac{4 \times \text{Area of Opening (in}^2\text{)}}{\text{Length of Opening Perimeter (in)}} = \frac{4A}{P}$$

A component-depleted gas stream is vented from a gas atmosphere above the liquid level in the gas-liquid contact zone to exterior of the enclosed gas-liquid contact zone.

While the gas-liquid contact procedure is generally operated with an enclosed reaction zone operating at or near atmospheric pressure, it also is possible to carry out the gas stream component removal method under superatmospheric and subatmospheric conditions, depending on circumstances and requirements.

While the present invention, in the gas stream component removal embodiment, is described specifically with respect to the removal of hydrogen sulfide and sulfur dioxide from gas streams containing the same by reaction to form sulfur and recovery of the so-formed sulfur by flotation by bubbles of the component-depleted gas stream, it will be apparent from the foregoing and subsequent discussion that both the apparatus provided in accordance with an aspect of the present invention and the gas stream component removal method embodiment of the invention are useful for effecting other procedures where a component of a gas stream is removed in a liquid medium or a component of a liquid medium is removed from by reaction with a gaseous component. In addition, it will be apparent that the present invention broadly relates to method and apparatus for distribution of a gas phase in a liquid phase for a variety of purposes.

In one preferred aspect of the invention, hydrogen sulfide contained in a gas stream is converted to solid sulfur particles by oxygen in an aqueous transition metal chelate solution as a reaction medium. The oxygen employed in this conversion process is present in an oxygen-containing gas stream which is introduced to the same submerged location in the aqueous catalyst solution as the hydrogen sulfide-containing gas stream, either in admixture therewith or as a separate gas stream. The oxygen-containing gas stream similarly is distributed as fine bubbles by the rotating impeller, which achieves intimate contact of oxygen and hydrogen sulfide with each other and the aqueous catalyst solution to effect the oxidation. The hydrogen sulfide, therefore, is removed by chemical conversion to insoluble sulfur particles.

The solid sulfur particles are permitted to grow or are subjected to spherical agglomeration or flocculation until they are of a size which enables them to be floated from the body of the reaction medium to the surface thereof by hydrogen sulfide-depleted gas bubbles.

The sulfur is of crystalline form and particles of sulfur are transported by the hydrogen-sulfide depleted gas bubbles from the reaction medium to the surface thereof when having a particle size of from about 10 to about 50 microns in diameter to form a sulfur froth floating on the surface of the aqueous medium and a hydrogen sulfide-depleted gas atmosphere above the froth, from which is vented a hydrogen sulfide-depleted gas stream. The sulfur-bearing froth is removed from the surface of the aqueous medium to exterior of the enclosed reaction zone, either on a continuous or intermittent basis.

Sulfur formed in such hydrogen sulfide-removing processes and provided as a froth on the surface of the liquid phase has been found to be highly adsorbent of other odiferous components, such as odiferous sulfurous and/or nitrogenous compounds, not oxidized and hence removed during the hydrogen sulfide oxidation. This result makes the process particularly useful in the treatment of exhaust gas streams from meat rendering plants, which contain a large variety of odiferous sulfur and nitrogen compounds, in addition to hydrogen sulfide, which are adsorbed by the sulfur on the surface of the reaction medium and hence are removed from the gas stream, thereby permitting an odour-reduced gas stream to be vented from the plant. The use of freshly precipitated high surface area sulfur for the removal of odiferous gases from gas streams is an additional aspect of the present invention.

Accordingly, in an additional aspect of the present invention, there is provided a continuous method for the removal of components from a gas stream comprising a component oxidizable to sulfur in an aqueous catalyst-containing medium and odiferous components not oxidizable in said aqueous medium, which comprises continuously forming sulfur in an aqueous phase from said component oxidizable to sulfur and collecting said continuous-formed sulfur as a froth on the surface of said gaseous phase, continuously passing said gas stream from said aqueous phase through said sulfur froth to contact sulfur in said froth and adsorb odiferous components from said gas stream, and continuously removing sulfur froth from the surface of said aqueous phase.

Since sulfur is formed continuously from the hydrogen sulfide or other sulfur-forming component and floated from the liquid phase, the sulfur in the froth on the surface of the liquid is continuously recovered, so that the odiferous compounds continuously contact fresh sulfur in the froth.

High levels of hydrogen sulfide removal efficiency are attained using the method of the present invention, generally in excess of 99.99%, from gas streams containing any concentration of hydrogen sulfide. Residual concentrations of hydrogen sulfide less than 0.1 ppm by volume can be attained. Corresponding removal efficiencies are achieved for the removal of other gaseous components from gas streams.

The method of the invention is able to remove effectively hydrogen sulfide from a variety of different source gas streams containing the same, provided there is sufficient oxygen present and dispersed in the reaction medium to oxidize the hydrogen sulfide. The oxygen may be present in the hydrogen sulfide-containing gas stream to be treated or may be separately fed, as is desirable where natural gas or other combustible gas streams are treated.

Hydrogen sulfide-containing gas streams which may be processed in accordance with the invention include fuel gas and natural gas and other hydrogen sulfide-containing streams, such as those formed in oil processing, oil refineries, mineral wool plants, kraft pulp mills, rayon manufacturing, heavy oil and tar sands processing, coking coal processing, meat rendering, a foul gas stream produced in the manufacture of carborundum and gas streams formed by air stripping hydrogen sulfide from aqueous phases. The gas stream may be one containing solids particulates or may be one from which particulates are absent. The ability to handle a particulate-laden gas stream in the present invention without plugging may be beneficial, since the necessity for upstream cleaning of the gas is obviated.

The method of the present invention as it is applied to effecting removal of hydrogen sulfide from a gas stream containing the same generally employs a transition metal chelate in aqueous medium as the catalyst for the oxidation of hydrogen sulfide to sulfur. The transition metal usually is iron, although other transition metals, such as vanadium, chromium, manganese, nickel and cobalt may be employed. Any desired chelating agent may be used but generally, the chelating agent is ethylenediaminetetraacetic acid (EDTA). An alternative chelating agent is HEDTA. The transition metal chelate catalyst may be employed in hydrogen or salt form. The operative range of pH for the process generally is about 7 to about 11.

The hydrogen sulfide removal process of the invention is conveniently carried out at ambient temperatures of about 20° to 25° C., although higher and lower temperatures may be adopted and still achieve efficient operation. The temperature generally ranges from about 5° to about 80° C.

The minimum catalyst concentration to hydrogen sulfide concentration ratio for a given gas throughput may be determined from the rates of the various reactions occurring in the process and is influenced by the temperature and the degree of agitation or turbulence in the reaction vessel. This minimum value may be determined for a given set of operating conditions by decreasing the catalyst concentration until the removal efficiency with respect to hydrogen sulfide begins to drop sharply. Any concentration of catalyst above this minimum may be used, up to the catalyst loading limit of the system.

The removal of hydrogen sulfide by the process of the present invention is carried out in an enclosed gas-liquid contact zone in which is located an aqueous medium containing transition metal chelate catalyst. A hydrogen sulfide-containing gas stream and an oxygen-containing gas stream, which usually is air but may be pure oxygen or oxygen-enriched air, are caused to flow, either separately or as a mixture, along a vertical flow path from outside the gas-liquid contact zone to a submerged location in the aqueous catalyst medium, from which the mixture is forced by the rotating impeller to flow through the shroud openings into the body of the aqueous medium. The rotating impeller also draws the liquid phase from the body of aqueous medium in the enclosed zone to the location of introduction of the gas streams, interior of the shroud.

As described above, the gas streams are distributed as fine bubbles by the combined action of the rotating impeller and the surrounding shroud which has a plurality of openings therethrough. To achieve good gas-liquid contact and hence efficient oxidation of hydrogen sulfide to sulfur, the impeller is rotated rapidly so as to achieve a blade tip velocity of at least about 350 in/sec, preferably about 500 to about 700 in/sec. In addition, shear forces between the impeller and the stationary shroud assist in achieving the good gas-liquid contact by providing a gas velocity index (as defined above) which is at least about 18 per second per opening, preferably at least about 24 per second per opening. In this aspect of the invention and the others described herein, other than at or near the upper limit of capacity of a unit, the gas flow rate through the openings is less than about 0.02 lb/min/opening in the shroud, generally down to about 0.004, and preferably in the range of about 0.005 to about 0.007 lb/min/opening in the shroud.

The distribution of the gases as fine bubbles in the reaction medium in the region of the impeller enables a high rate of mass transfer to occur. In the catalyst solution, a complicated series of chemical reactions occurs resulting in an overall reaction which is represented by the equation:

$$H_2S + \tfrac{1}{2}O_2 \rightarrow S + H_2O$$

The overall reaction thus is oxidation of hydrogen sulfide to sulfur.

As noted earlier, the solid sulfur particles grow in size until of a size which can be floated. Alternative procedures of increasing the particle size may be employed, including spherical agglomeration or flocculation. The flotable sulfur particles are floated by the hydrogen sulfide-depleted gas bubbles rising through the body of catalyst solution and collected as a froth on the surface of the aqueous medium. The sulfur particles range in size from about 10 to about 50 microns in diameter and are in crystalline form.

The series of reactions which is considered to occur in the metal chelate solution to achieve the overall reaction noted above is as follows:

$$H_2S = H^+ + HS^-$$

$$OH^- + FeEDTA^- = [Fe.OH.EDTA]^=$$

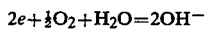

Alternatively, the oxygen-containing gas stream may be introduced to the metal chelate solution at a different submerged location from the hydrogen sulfide-containing air stream using a second impeller/shroud combination, as described in more detail in copending U.S. patent application Ser. No. 709,158 filed Jun. 3, 1991 ("Dual Impeller"), assigned to the assignee hereof, the disclosure of which is incorporated herein by reference.

In another preferred aspect of the present invention, sulfur dioxide is reacted with an alkaline medium to remove the sulfur dioxide from a gas stream bearing the same. Sulfur dioxide is absorbed from the gas stream into the aqueous alkaline medium and reacts with active alkali therein to form salts, with the sulfur dioxide-depleted gas stream being vented from the reaction medium. The procedure shows many similarities with the hydrogen sulfide-removal procedure just described, except that the aqueous medium contains an alkaline material.

The aqueous alkaline medium into which the sulfur dioxide-containing gas stream is introduced may be provided by any convenient alkaline material in aqueous dissolution or suspension. One convenient alkaline material which can be used is an alkali metal hydroxide, usually sodium hydroxide. Another convenient material is an alkaline earth metal hydroxide, usually a lime slurry or a limestone slurry.

Absorption of sulfur dioxide in an aqueous alkaline medium tends to produce the corresponding sulfite. It is preferred, however, that the reaction product be the corresponding sulfate, in view of the greater economic attraction of the sulfate salts. For example, where lime or limestone slurry is used, the by-product is calcium sulfate (gypsum), a multi-use chemical.

Accordingly, in a preferred aspect of the invention, an oxygen-containing gas stream, which usually is air but which may be pure oxygen or oxygen-enriched air, analogously to the case of hydrogen sulfide, also is introduced to the aqueous alkaline reaction medium, so as to cause the sulfate salt to be formed. When such oxidation reaction is effected in the presence of a lime or limestone slurry, it is generally preferred to add a small amount of an anti-caking agent, to prevent caking of the by-product calcium sulfate on the lime or limestone particles, decreasing their effectiveness. One suitable anti-caking agent is magnesium sulfate.

The concentration of sulfate salt builds up in the aqueous solution after initial start up until it saturates the solution, whereupon the sulfate commences to precipitate from the solution. The crystalline sulfate, usually sodium sulfate or calcium sulfate crystals, may be floated from the solution by the sulfur dioxide depleted gas bubbles, if desired, with the aid of flotation-enhancing chemicals, if required.

The oxygen-containing gas stream, when used, may be introduced to the aqueous medium at the same submerged location as the sulfur dioxide-containing gas stream, either in admixture with the sulfur dioxide-containing gas stream or as a separate gas stream.

Alternatively, the oxygen-containing gas stream may be introduced to the aqueous alkaline medium at a different submerged location from the sulfur dioxide-containing gas stream using a second impeller/shroud combination, as described in more detail in the aforementioned copending U.S. patent application Ser. No. 709,158.

The process of the invention is capable of rapidly and efficiently removing sulfur dioxide from gas streams containing the same. Such gas streams may contain any concentration of sulfur dioxide and the process is capable of removing such sulfur dioxide in efficiencies exceeding 99.99%. Residual sulfur dioxide concentrations below 0.1 ppm by volume can be achieved.

This sulfur dioxide removal embodiment of the invention can be carried out under a variety of process conditions, the choice of conditions depending, to some extent, on the chemical imparting alkalinity to the reaction medium. For an alkali metal hydroxide, the aqueous alkaline solution generally has a concentration of from about 50 to about 500 g/L. For an alkaline earth metal hydroxide, the aqueous alkaline solution generally has a concentration of from about 1 to about 20 wt %. The active alkalinating agent may be continuously and intermittently replenished to make up for the conversion to the corresponding sulfite or sulfate. The reaction temperature may vary widely from about 5° to about 80° C.

In addition to the removal of gaseous components from a gas stream as particularly described above, the procedure of the present invention, employing the impeller-shroud combination, and the operating parameters of impeller tip speed velocity and gas velocity index through the shroud, also may be used in other instances where distribution of gas phase in a liquid phase is desired and intimate contact of gas and liquid phases is desired.

For example, the procedure of the invention may be employed in waste water treatment, where undesired dissolved components in the liquid phase, including both BOD and COD, are removed by oxygenation by oxygen contained in a gas stream and dispersed as fine bubbles in the liquid phase in the manner described above.

Another example involves the blending of wood pulp in a slurry in the liquid phase by dispersing oxygen, ozone or a mixture of such gases, as fine gas bubble in the liquid phase to provide an intimate contact of gas, liquid and solid phases to achieve oxidation of components of the wood pulp fibers.

Another application of the process of the invention in the pulp and paper industry is the oxidation of components of white liquor. White liquor is a solution of sodium sulfide and sodium hydroxide used to form wood pulp from wood chips. Oxidation of such material may be achieved by dispersing oxygen or an oxygen-containing gas stream in the white liquor using the procedures described herein.

The dispersion of gaseous phase in the liquid phase in the present invention may be combined with other components to effect the desired reaction or interaction between gaseous and liquid phase components. As described above, such additional component may comprise a catalyst dissolved in the liquid phase promoting reaction between gaseous components.

Another example is the removal of the volatile organic compounds (VOC's), as well as semi-volatile organic chemicals, from aqueous streams using an oxygen-containing gas distributed as fine bubbles with the impeller and shroud combination and the process conditions described herein. The shroud and/or impeller may be coated with a solid catalyst for catalyzing oxidation of the VOCs to carbon dioxide and other harmless oxidation products.

In this procedure, a multi-stage unit may be employed consisting of three or four independent impeller systems, together with a feed of oxygen or other oxygen-containing gas, such as air, possibly under pressure. The water to be treated to remove VOCs then may be introduced at one end of the series of contactors and removed, after treatment, at the other end. In each contacting stage, the VOCs are stripped from the aqueous phase by the fine bubbles of oxygen-containing gas and, at the same time, converted by oxidation in contact with the catalyst to carbon dioxide, water and perhaps chlorine or hydrogen chloride, depending on the chemical nature of the VOCs treated. At the levels of volatile organic contamination generally found, these impurities do not create significant difficulties for the process.

There are several advantages to this VOCs-treatment process. The procedure operates economically under significantly higher oxygen pressure than normally encountered with air, which tends to increase mass transfer and chemical reaction rates significantly, since VOC oxidation is usually a first order reaction in terms of oxygen partial pressure. No bleed of oxygen containing stripped VOCs is required, since the main products are carbon dioxide, water and the minor impurities mentioned above, which achieve an equilibrium state with the oxygen.

Alternatively, the VOCs may be stripped from the aqueous phase by the air stream distributed in the aqueous phase to form a gas stream containing such stripped VOCs, which then may be passed in contact with the catalyst for oxidation of VOCs to carbon dioxide and similar oxidation products external to the stripping operation.

If desired, liquid circulation within the contactor can be controlled by a series of overflow-underflow weirs, ensuring good gas-liquid contact and a reasonable residence time of liquid within each contact cell. The liquid flow rate can be modified over a wide range depending on the contaminant level and activity.

DESCRIPTION OF PREFERRED EMBODIMENT

Referring to the drawings, a novel gas-liquid contact apparatus 10, provided in accordance with one embodiment of the invention, is a modified form of an agitated flotation cell. The design of the gas-liquid contactor 10 is intended to serve the purpose of efficiently contacting gases and liquids, for example, to effect removal of a component of the gas, such as by reaction to produce a flotable insoluble phase, but also applicable to the chemical conversion of aqueous phase components by gaseous phase components dispersed in the liquid phase. This design differs from that of an agitated flotation cell whose objective is to separate a slurry or suspension into a concentrate and a gangue or barren stream.

There are significant differences between a conventional agitated flotation cell and the modified flotation cell 10 of the present invention which arise from the differences in requirements of the two designs. In the present invention, the substances which are treated may be contained in the gas stream or the liquid phase whereas, in an agitated flotation cell, the substances which are treated are the solid phase contained within the slurry and the gas is employed solely to float the desired particles out of the slurry without chemical or other modification to such particles. To the extent the present invention involves treatment of components in the liquid phase, such treatment generally involves chemical interaction of components.

An agitated flotation cell is designed to process a slurry or suspension to effect physical separation of a solid phase. The capacity of the cell is measured as the volume of treated slurry in a given time and the efficiency is measured as the mass fraction of desired mineral physically separated relative to that in the entering slurry or suspension. Normally, a number of stages is required in such mineral separation operation, including a roughing stage to effect the non-reactive separation. In contrast, an apparatus which removes a component from a gas stream by chemical reaction or physical separation, as in the case of device 10, is engineered to process and treat a flow of gas. Capacity is measured in volume of gas throughput and efficiency is measured in terms of the relative removal as compared to the desired removal. Normally, only one separation step is required.

In addition, an agitated flotation cell is designed to generate a multiplicity of small air bubbles which are distributed uniformly throughout the slurry by means of a shroud to ensure good contacting between gas bubbles and the desired mineral particles within the body of the slurry external to the shroud. Normally, no chemical reaction takes place in the cell but surface-active agents may be added to change the flotability of the concentrate. In contrast, in a chemical reactor, such as gas-liquid contact device 10, the contacting and reaction chemistry are of paramount importance and directly affect the efficiency of the unit, whether involving reaction of gaseous phase components one with another or reaction of gaseous phase components with liquid phase components. The conditions which exist in the interior and to the immediate exterior of the shroud are critical for the purposes of the present invention. Effective contacting between gas phase and liquid phase is achieved in the present invention to effect chemical and physical separation operations by rotation of the impeller at rates well in excess of those used in an agitated flotation cell and by utilizing a shroud with much smaller openings, leading to a much higher gas velocity index than used as agitated flotation cell. The reactor 10 as an $H_2S$ reactor utilizes a chemical reaction in which hydrogen sulfide is oxidized through the medium of a catalyst by oxygen in the interior of the shroud and to the immediate exterior of the shroud. The flotation of sulfur by hydrogen-sulfide depleted gas bubbles is a very significant additional benefit in the operation of the reactor but is not a primary design criterion.

In a conventional agitated flotation cell, the impeller is small relative to the size of the flotation cell, since its purpose is to produce a myriad of small bubbles to be distributed and dispersed through the liquid slurry and not to promote efficient gas-liquid contacting. The shroud is designed with relatively few large openings to distribute the small bubbles produced by the impeller uniformly in the cell, ensuring good contacting between the bubbles and the desired contacting phase to promote the desired phase separation. The bubbles are maintained within a relatively narrow size range to ensure a large surface area for gas-solid contacting, not gas-liquid contacting as desired herein, and the bubbles are active throughout the entire volume of the cell, otherwise the desired solid phase separation would not be achieved. As conventional agitated flotation cells increase in size, the proportion of liquid pumped through the shroud increases and the momentum of the liquid carries the bubbles required for flotation to the outer reaches of the cell.

In contrast, in the gas-liquid contactor herein, the impeller may be larger relative to the size of the reactor and its design may be altered to increase the efficiency of gas-liquid contacting. Most of the chemical or physical process occurs very close to the impeller, to the interior of the shroud and to its immediate exterior, so that the effective or active zone is a much smaller fraction of cell volume than in the case of flotation where separation in the bulk is required. The shroud is designed herein with a large number of smaller openings, which usually have sharp edges (i.e. the surfaces intersect at an acute angle) to promote secondary contacting by which gas shearing further improves the efficiency of the gas-liquid contacting reaction.

In the apparatus 10 of the invention, the gas inlets and outlets are much larger than in a conventional flotation cell to accommodate an increased flow of gas. Similarly, liquid inlets and outlets are sufficient for the purposes of filling and draining the vessel, but not for the continuous flow of slurry as in the case of the agitated flotation cell.

The reactor 10, constructed in accordance with one embodiment of the invention and useful in chemical and physical processes for removing a component from a gas stream, such as oxidative removal of hydrogen sulfide, and other gas-liquid contacting processes, such as described above, comprises an enclosed housing 12 having a standpipe 14 extending from exterior to the upper wall 16 of the housing 12 downwardly into the housing 12. The housing 12 may be of any convenient shape, generally rectangular. The housing 12 may be designed such as to avoid dead zones in the liquid phase contained within the housing.

Inlet pipes 18,20 communicate with the standpipe 14 through an inlet manifold at its upper end for feeding a gas stream, in this illustrated embodiment, hydrogen sulfide-containing gas stream and air to reactor 10. The inlet pipes 18,20 have inlet openings 22,24 through which the gas flows. The openings are designed to provide a low pressure drop.

Generally, the flow rate of gas streams may range upwardly from a minimum of about 50 cu.ft/min., for example, in excess of about 500 cu.ft/min., although much higher or lower flow rates may be employed, depending on the intended application of the process. The pressure drop across the unit may be quite low and may vary from about −5 to about +10 in. $H_2O$, preferably from about 0 to less than about 5 in. $H_2O$. For larger units employing a fan or a blower to assist the gas flow rate to the impeller, the pressure drop may be greater.

A shaft 26 extends through the standpipe 14 and has an impeller 28 mounted at its lower end just below the lower extremity of the standpipe 14. A drive motor 30 is mounted to drive the shaft 26. Although there is illustrated in the drawings an apparatus 10 with a single impeller 28, it is possible to provide more than one impeller and hence more than one oxidative reaction (or other chemical or physical process) location in the same enclosed tank. The gas flow rate to the reactor referred to above represents the flow rate per impeller.

The impeller 28 comprises a plurality of radially-extending blades 32. The number of such blades may vary and generally at least four blades are employed, with the individual blades being equi-angularly spaced apart. The impeller is illustrated with the blades 32 extending vertically. However, other orientations of the blades 32 are possible.

Generally, the standpipe 14 has a diameter dimension related to that of the impeller 28 and the ratio of the diameter of the standpipe 14 to that of the impeller 28 generally may vary from about 1:1 to about 2:1. However, the ratio may be lower, if the impeller is mounted below the standpipe. The impeller 28 generally has a height which corresponds to an approximately 1:1 ratio with its diameter, but the ratio generally may vary from about 0.3:1 to about 3:1. As the gas is drawn down through the standpipe 14 by the action of the rotary impeller 28 and the liquid phase is drawn into the impeller, the action of gas and liquid flows and rotary motion produce a vortex of liquid phase in the upper region of the impeller 28. Alternatively, the gas may be introduced below the impeller and drawn into the interior of the shroud by the action of the impeller.

The ratio of the projected cross-sectional area of the shrouded impeller 28 to the cross-sectional area of the cell may vary widely, and often is less but may be more than in a conventional agitated flotation cell, since the reaction is confined to a small volume of the reaction medium and will be determined by the ultimate use to which the apparatus 10 is put. The ratio may be as little as about 1:2. However, where additional processing of product is required to be effected efficiently, such as flotation of sulfur, the ratio generally will be higher.

Another function of the impeller 28 is to distribute the induced gases as small bubbles within the liquid medium in the interior of the shroud. This result is achieved by rotation of the impeller 28, resulting in shear of liquid and gases to form very fine bubbles dimensioned so that the largest are no more than about ¼ inch in diameter. Generally, the bubbles are dimensioned so that, as they leave the shroud openings, the large majority of the bubbles all have a dimension less than about 2 mm, and typically about 0.5 to 0.7 mm diameter. In this way, a gas-liquid mixture of fine gas bubbles in the liquid phase is formed contained within the shroud 34.

A critical parameter in determining an adequate shearing to form the gas bubbles is the velocity of the outer tip of the blades 32. A blade tip velocity of at least about 350 in/sec is required to achieve efficient (i.e., 99.99%+) removal of hydrogen sulfide, preferably about 500 to about 700 in/sec. This blade tip velocity is much higher than typically used in a conventional agitated flotation cell, wherein the maximum velocity is about 275 in/sec.

The impeller 28 is surrounded by a cylindrical stationary shroud 34 having a uniform array of circular openings 36 through the wall thereof. The shroud 34 generally has a diameter slightly greater than the standpipe 14. Although, in the illustrated embodiment, the shroud 34 is right cylindrical and stationary, it is possible for the shroud 34 to possess other shapes. For example, the shroud 34 may be tapered, with the impeller 28 optionally also being tapered. In addition, the shroud 34 may be rotated, if desired, usually in the opposite direction to the impeller 28. Further, the shroud 34 is shown as a separate element from the standpipe 14. However, the shroud 34 may be provided as an extension of the standpipe, if desired.

Further, the openings 36 in the shroud are illustrated as being circular, since this structure is convenient. However, it is possible for the openings to have different geometrical shapes, such as square, rectangular or hexagonal. Further, all the openings 36 need not be of the same shape or size.

The shroud 34 serves a multiple function in the device. Thus, the shroud 34 prevents gases from by-passing the impeller 28, assists in the formation of the vortex in the liquid necessary for gas induction, assists in achieving shearing as well as providing additional shearing and confines the gas-liquid mixture and hence maintains the turbulence produced by the impeller 28. The effect of the impeller-shroud combination may be enhanced by the employment of a series of elongate baffles, provided on the internal wall of the shroud 34, preferably vertically extending from the lower end to the upper end of the openings in the shroud. The gas-liquid mixture flows through and in contact with the openings 36 in the shroud which results in further shearing of the fine gas bubbles and further intimate contact of the gaseous and liquid phases.

The shroud 34 is spaced only a short distance from the extremity of the impeller blades 30, in order to provide and promote the above-noted functions. Generally, the ratio of the diameter of the shroud 34 to that of the impeller 28 generally is about 3:1 to about 1.1:1, preferably approximately 1.5:1.

In contrast to the shroud in a conventional agitated flotation cell, the openings 36 generally are larger in number and smaller in diameter, in order to provide an increased area for shearing, although an equivalent effect can be achieved using openings of large aspect ratio, such as slits. When such circular openings are employed, the openings 36 generally are uniformly distributed over the wall of the shroud 34 and usually are of equal size. The equivalent diameter of the openings 36 often is less than about one inch and generally should be as small as possible without plugging, preferably about ⅜ to about ⅝ inch in diameter, in order to provide for the required gas flow therethrough. When the openings 36 are of non-circular geometrical shape and of aspect ratio which is approximately unity, then the area of each such opening 36 generally is, less than the area of a circular opening having an equivalent diameter of about one inch, preferably about ⅜ to about ⅝ inch. The openings have sharp corners to promote shearing of the gas bubbles passing through the openings and contacting the edges.

The openings 36 are dimensioned to permit a gas flow rate therethrough corresponding to less than about 0.02 lb/min/shroud opening, generally down to about 0.004 lb/min/shroud opening. As noted earlier, the gas flow rate may be higher at or near the upper limit of capacity of the unit. Preferably, the gas flow rate through the shroud openings is about 0.005 to about 0.007 lb/min/opening in the shroud. As noted above, in general, the gas velocity index is at least about 18 per second per opening in the shroud, preferably at least about 24 per second per opening, and more preferably at least about 30 per second per opening.

As a typical example, in a conventional agitated flotation cell, forty-eight circular openings 1.25 inches in diameter for a circumferential length of 188 inches may be employed while, in the same size unit constructed as a reactor in accordance with the present invention, 670 circular openings each ⅜-inch in diameter are used for a total circumferential length of 789 inches. In addition, in the present invention the gas flow through the openings is typically 0.007 lb/min/opening (a gas velocity index of 65 per second per opening) in the shroud, while in a conventional agitated flotation cell of the same unit size the same parameter is 0.03 lb/min/opening (a gas velocity index less than 10 per second per opening) in the shroud. As may be seen from this typical comparison, the physical dimensions of the openings and the gas flow are significantly different in the gas-liquid contact device of this invention from those in an agitated flotation cell.

The spacing between openings is largely dictated by considerations of adequacy of structural strength and the desired liquid and gas flow introduction. Generally, each circular opening, is spaced from about 0.25 to about 0.75 of the diameter of the opening from each other, typically about 0.5, although other arrangements are possible. Generally, the plurality of openings is arranged at a density of less than about 2 per square inch in a regular array.

The shroud 34 is illustrated as extending downwardly for the height of the impeller 28. It is possible for the shroud 34 to extend below the height of the impeller 28 or for less than its full height, if desired.

In addition, in the illustrated embodiment, the impeller 28 is located a distance corresponding approximately half the diameter of the impeller 28 from the bottom wall of the reactor 10. It is possible for this dimension to vary from no less than about 0.25:1 to about 1:1 or greater of the proportion of the diameter dimension of the impeller. This spacing of the impeller 28 from the lower wall allows liquid phase to be drawn into the area between the impeller 28 and the shroud 34 from the mass in the reactor. If desired, a draft tube may be provided extending into the body of the liquid phase from the lower end of the impeller, to guide liquid into the region of the impeller.

By distributing the gases in the form of tiny bubbles and effecting shearing of the bubbles in contact with the iron chelate solution within the shroud 34 and during passage through the openings 36 therein, rapid mass transfer occurs and the hydrogen sulfide is rapidly oxidized to sulfur. The reaction occurs largely in the immediate region of the impeller 28 and shroud 34 and forms sulfur and hydrogen sulfide-depleted gas bubbles.

The sulfur particles initially remain suspended in the turbulent reaction medium but grow in the body of the reaction medium to a size which enables them to be floated by the hydrogen sulfide-depleted gas bubbles. When the sulfur particles have reached a size in the range of about 10 to about 50 microns in diameter, they possess sufficient inertia to penetrate the boundary layer of the gas bubbles to thereby enable them to be floated by the upwardly flowing hydrogen sulfide-depleted gas bubbles.

Other odiferous components of the hydrogen sulfide-containing gas stream, such as mercaptans, disulfides and odiferous nitrogenous compounds, such as putrescenes and cadaversenes, also may be removed by adsorption on the sulfur particles.

At the surface of the aqueous reaction medium, the floated sulfur accumulates as a froth 38 and the hydrogen sulfide-depleted gas bubbles enter an atmosphere 40 of such gas above the reaction medium 42. The presence of the froth 38 tends to inhibit entrainment of an aerosol of reaction medium in the atmosphere 40.

A hydrogen sulfide-depleted gas flow outlet 44 is provided in the upper closure 16 to permit the treated gas stream to pass out of the reactor vessel 12.

An adequate freeboard above the liquid level in the reaction vessel is provided greater than the thickness of the sulfur-laden froth 38, to further inhibit aerosol entrainment.

Paddle wheels 46 are provided adjacent the edges of the vessel 12 in operative relation with the sulfur-laden froth 38, so as to skim the sulfur-laden froth from the surface of the reaction medium 42 into collecting launders 48 provided at each side of the vessel 12. The skimmed sulfur is removed periodically or continuously from the launders 48 for further processing.

The sulfur is obtained in the form of froth containing about 15 to about 50 wt. % sulfur in reaction medium. Since the sulfur is in the form of particles of a relatively narrow particle size, the sulfur is readily separated from the entrained reaction medium, which is returned to the reactor 10.

The gas-liquid contact apparatus 10 provides a very compact unit which rapidly and efficiently removes hydrogen sulfide from gas streams containing the same. Such gas streams may have a wide range of concentrations of hydrogen sulfide. The compact nature of the unit leads to considerable economies, both in terms of capital cost and operating cost, when compared to conventional hydrogen sulfide-removal systems.

There has previously been described in U.S. Pat. No. 3,993,563 a gas ingestion and mixing device of the general type described herein. In that reference, it is indicated that, for the device described therein, if an increase in the rotor speed is made in an attempt to obtain greater gas-liquid mixing action, then it is necessary to employ a baffle in the standpipe in order to obtain satisfactory gas ingestion. As is apparent from the description herein, such a baffle is not required in the present invention.

However, with larger size units designed to handle large volumes of gas, it may be desirable to provide a conical perforated hood structure above the impeller-shroud combination to quieten the surface of the liquid medium in the vessel.

Figure 3:
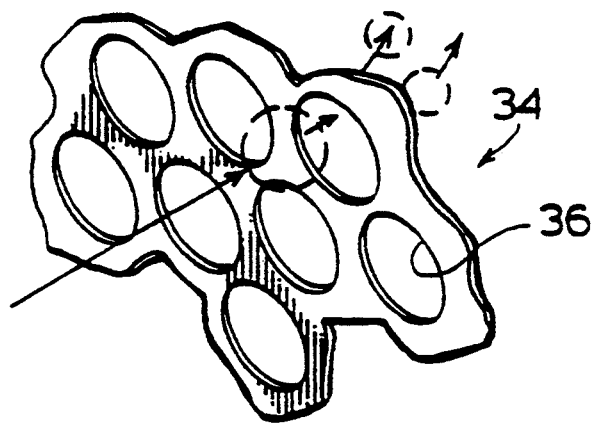
FIG. 3 is a close-up perspective view of a portion of the shroud of FIG. 2.
Figure 4:
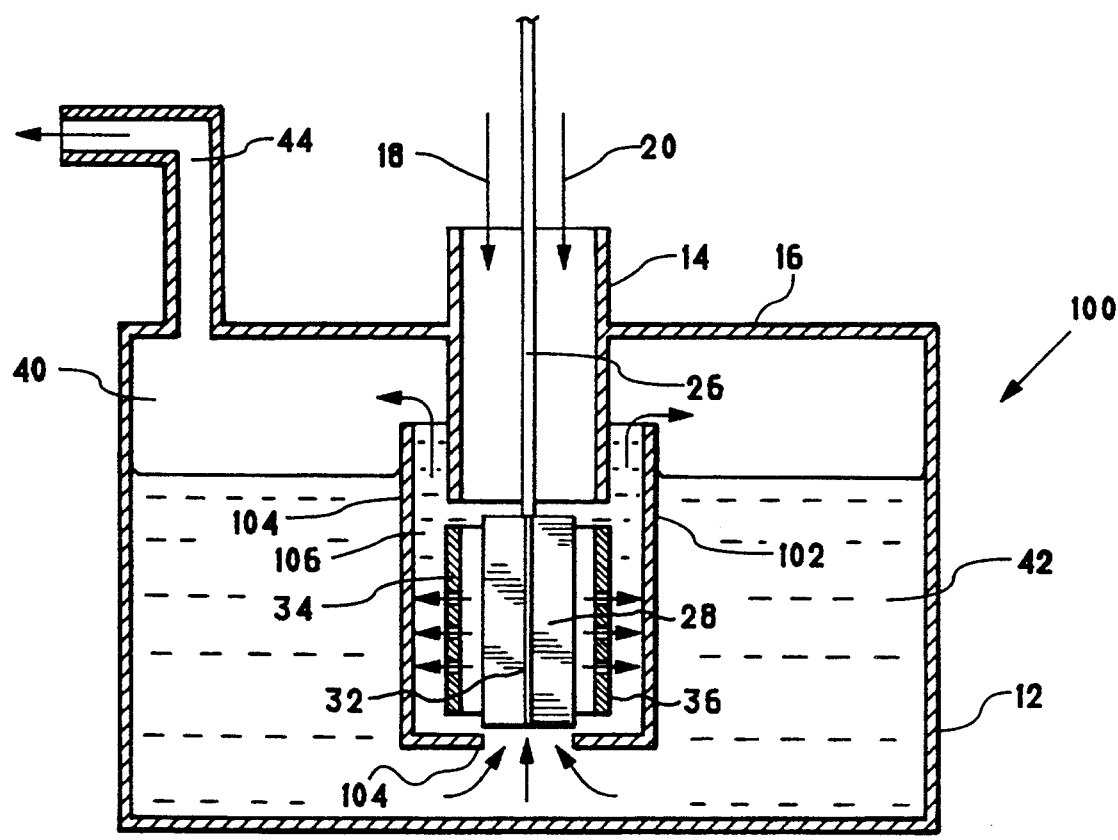
FIG. 4 is a upright sectional view of a novel gas-liquid contact apparatus provided in accordance with a second embodiment of the invention.

Referring now to FIG. 4, there is illustrated therein an alternative embodiment of apparatus 100 provided by this invention. Elements of this apparatus 100 which are in common with those employed in apparatus 10 of FIGS. 1 to 3 have been designated by the same reference numerals as used therein and a description of their construction and operation will not be repeated.

In apparatus 100, a baffle arrangement 102 surrounds and is spaced from the shroud 34. The baffle 102 has a lower opening 104 to permit reaction medium 42 to be drawn by the action of the impeller 28 into the interior of the shroud 34. The baffle 102 has a cylindrical wall 104 which terminates at its upper extremity above the liquid level of the reaction medium 42 and hence defining an annular flow path for gas, liquid and any product of reaction thereof external of the shroud 34 to the gas spaced 40 for separation of gas and liquid phase thereat.

EXAMPLES

Example 1

A pilot plant apparatus was constructed as schematically shown in FIG. 1 and was tested for efficiency of removal of hydrogen sulfide from a gas stream containing the same.

The overall liquid capacity of the tank was 135 L. The standpipe had an inside diameter of 7½ in., and the impeller consisted of six blades and had a diameter of 5½ in. and a height of 6¼ in. and was positioned 2¼ in. from the base of the tank.

The pilot plant apparatus, fitted with a standard froth flotation shroud and impeller combination, was charged with 110 L of an aqueous solution which contained 0.016 mol/L of ethylenediaminetetraacetic acid, iron-ammonium complex and 0.05 mol/L of sodium hydrogen carbonate. The pH of the aqueous medium was 8.5. The shroud consisted of a stationary cylinder of outside diameter 12 in., height 5¾ in and thickness ¾ in. in which was formed 48 circular openings each 1.25 in. in diameter, for a total circumferential length of 188 inches.

Air containing 4000 ppm by volume of hydrogen sulfide was passed through the apparatus via the standpipe at a rate of 835 L/min. at room temperature while the impeller in the aqueous medium rotated at a rate of 733 rpm., corresponding to a blade tip velocity of about 211 in/sec. The gas velocity index through the shroud openings was 11.7 per second per opening in the shroud. (The gas flow rate was 0.05 lb/min/opening.) Over the one and a half hour test period, 99.5% of the hydrogen sulfide was removed from the gas stream, leaving a residual amount of H$_2$S in the gas stream of 20 ppm. Sulphur was formed and appeared as a froth on the surface of the aqueous solution and was skimmed from the surface using the paddle wheels. Simultaneous removal of hydrogen sulfide from the gas stream and recovery of the sulfur produced thereby, therefore, was effected.

During the test period, the pH of the aqueous solution dropped to 8.3 but no additional alkali was added during this period. Further, no additional catalyst was added during the period of the test.

Example 2

The procedure of Example 1 was repeated with an increased impeller rotation rate and higher gas flow rate.

Air containing 4000 ppm by volume of hydrogen sulfide was passed through the apparatus via the standpipe at a rate of 995 L/min. at room temperature while the impeller in the aqueous medium rotated at a rate of 1772 rpm corresponding to a blade tip velocity of about 510 in/sec. The gas velocity index through the shroud openings was 13.7 per second per opening in the shroud. (The gas flow rate was 0.06 lb/min/opening.) Over the two hour test period 99.7% of the hydrogen sulfide was removed from the gas stream, leaving a residual amount of H$_2$S of 11 ppm. Sulfur was formed and appeared as a froth on the surface of the aqueous solution and was skimmed from the surface. Simultaneous removal of hydrogen sulfide from the gas stream and recovery of the sulfur produced thereby, therefore, was effected.

During the test period, the pH of the aqueous solution dropped to 8.3 but no additional alkali was added during this period. Further, no additional catalyst was added during this period of the test.

Example 3

Figure 2:
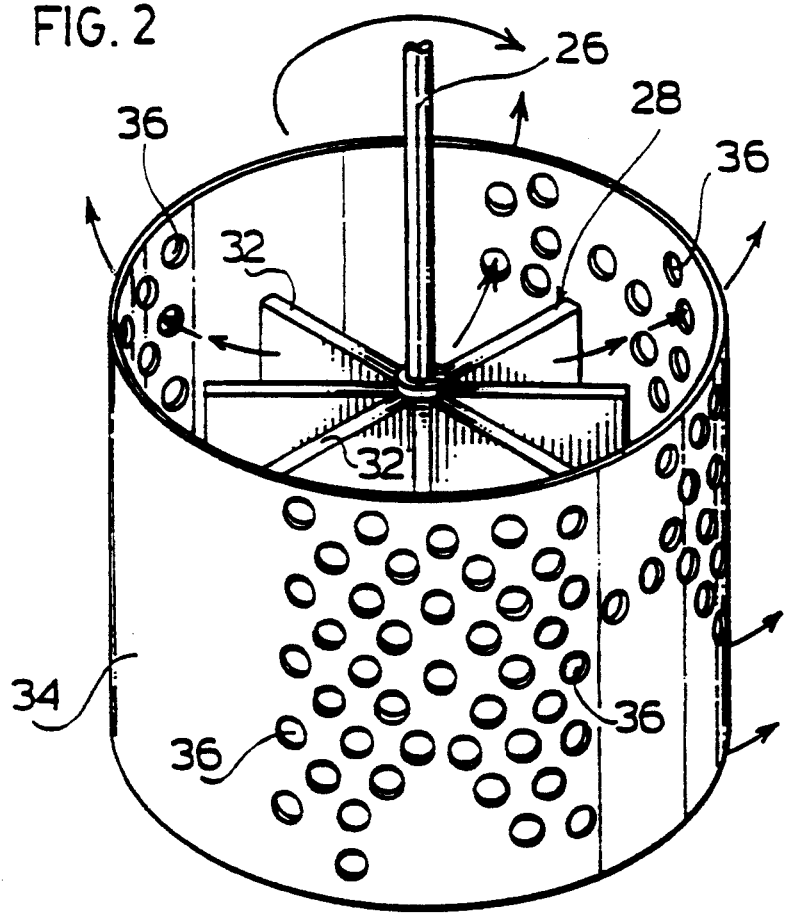
FIG. 2 is a detailed perspective view of the impeller and shroud of the apparatus of FIG. 1.

The pilot plant apparatus was modified and fitted with a shroud and impeller combination as illustrated in FIG. 2, was charged with 110 L of an aqueous solution which contained 0.016 mol/L of ethylenediaminetetraacetic acid, iron-ammonium complex and 0.05 mol/L of sodium hydrogen carbonate. The pH of the aqueous solution was 8.5. The shroud consisted of a stationary cylinder of outside diameter 12¾ in., height 8½ in., and thickness ½ in. in which was formed 670 openings each of ⅜ in. diameter for a total circumferential length of 789 inches. Vertical baffles extending vertically from top to bottom of the shroud were provided on the internal wall equally arcuately spaced, ten in number with a ¼-inch×¼-inch space cross section. The impeller was replaced by one having a diameter of 6½ in. The other dimensions remained the same.

Air containing 4000 ppm by volume of hydrogen sulfide was passed through the apparatus via the standpipe at a rate of 995 L/min. at room temperature while the impeller in the aqueous medium rotated at a rate of 1754 rpm., corresponding to a blade tip velocity of about 597 in/sec. The gas velocity index through the shroud was 36.3 per second per opening. (The gas flow rate was 0.004 lb/min/opening.) Over the two hour test period 99.998% of the hydrogen sulfide was removed from the gas stream, leaving a residual amount of $H_2S$ of less than 0.1 ppm. Sulphur was formed and appeared as a froth on the surface of the aqueous solution and was skimmed from the surface. Simultaneous removal of hydrogen sulfide from the gas stream and recovery of the sulfur produced thereby, therefore, was effected.

During the test period, the pH of the aqueous solution remained relatively constant at 8.5. No additional alkali or catalyst was added during the period of this test.

As may be seen from a comparison of the results presented in Examples 1, 2 and 3, it is possible to remove hydrogen sulfide with greater than 99% efficiency using an agitated flotation cell which is provided with a conventional shroud and impeller construction (Examples 1 and 2), as already described in Canadian Patent No. 1,212,819. However, by employing a higher blade tip velocity, as in Example 2, a modest increase in efficiency can be achieved.

However, as seen in Example 3, with a shroud modified as described therein to provide the critical gas flow rate and using the critical blade tip velocity, efficiency values over 99.99% can be achieved, leaving virtually no residual hydrogen sulfide in the gas stream.

Example 4

The pilot plant apparatus of FIG. 1 was tested for efficiency of removal of sulfur dioxide from a gas stream containing the same. The elements of the pilot plant apparatus were dimensioned as described in Example 3.

The pilot plant apparatus was charged with 110 L of an aqueous slurry containing 13.2 kg of CaO and 3450 g of $MgSO_4.7H_2O$. Air, containing varying amounts of sulfur dioxide was passed through the apparatus via the standpipe at varying flow rates at room temperature, while the impeller in the aqueous slurry rotated at a rate varying from 1760 to 1770 rpm, corresponding to a blade tip velocity of 599 to 602 in/sec. The corresponding gas velocity indices through the shroud were from 31.1 to 124.5 per second per opening. (The gas flow rates were 0.003 to 0.01 lb/min/opening.)

A series of one hour runs was performed and the residual $SO_2$ concentration was measured after 45 minutes. The results obtained are set forth in the following Table I:

TABLE I

| Gas Flow Rate (cfm) | $SO_2$ Concentration In*[1] (ppmv) | Out*[2] | RPM |
|---|---|---|---|
| 30 | 1000 | <0.4 | 1760 |
| 30 | 5000 | <0.4 | 1760 |
| 30 | 7000 | <0.4 | 1760 |
| 30 | 10000 | 0.6 | 1760 |
| 60 | 900 | <0.4 | 1770 |
| 75 | 1000 | <0.4 | 1760 |

TABLE I-continued

| Gas Flow Rate (cfm) | $SO_2$ Concentration In*[1] (ppmv) | Out*[2] | RPM |
|---|---|---|---|
| 100 | 1000 | 0.8 | 1763 |
| 120 | 1000 | 5.6 | 1770 |

Notes:
[1]Concentration values vary approximately ± 10%.
[2]Concentration values vary approximately ± 0.2 ppm by volume.

As may be seen from this data, highly efficient (>99.99%) removal of sulfur dioxide from the gas stream was obtained using a lime slurry, even at high sulfur dioxide concentrations and less efficient removal were observed only at high gas flow rate.

Example 5

The procedure of Example 4 was repeated using 110 L of an aqueous slurry of 13.2 kg of calcium carbonate and 3450 g of $MgSO_4.7H_2O$. In these experiments, the impeller was rotated at a speed of 1770 to 1775 rpm, corresponding to a blade tip velocity of 602 to 604 in/sec. The corresponding gas velocity index through the shroud were 31.1 to 103.8 per second per opening. (The gas flow rates were 0.003 to 0.01 lb/min/opening)

The results obtained are set forth in the following Table II:

TABLE II

| Gas Flow Rate (cfm) | $SO_2$ Concentration In[1] (ppmv) | Out[2] | RPM |
|---|---|---|---|
| 30 | 900 | <0.4 | 1770 |
| 30 | 2000 | <0.4 | 1770 |
| 30 | 3000 | <0.4 | 1770 |
| 30 | 5000 | <0.4 | 1770 |
| 30 | 9000 | <0.4 | 1770 |
| 30 | 10000 | <0.4 | 1770 |
| 45 | 1000 | <0.4 | 1773 |
| 60 | 1000 | <0.4 | 1775 |
| 75 | 1050 | <0.4 | 1775 |
| 100 | 1000 | 5.25 | 1775 |

Notes:
[1]Concentration values vary approximately ± 10%.
[2]Concentration values vary approximately ± 0.2 ppm by volume except for last run, approximately ± 1 ppm by volume.

As may be seen from this data, highly efficient (>99.99%) removal was obtained using a limestone slurry, even at high sulfur dioxide concentrations and less efficient removal were observed only at high gas flow rate.

Example 6

A bench scale reaction was set up corresponding in construction to the apparatus of FIG. 1. 4 L of the catalyst solution described in Example 3 was charged to the reactor. An off-gas stream from a feathers cooker of a meat rendering plant was fed to the reactor along with air and, outer the test period, the pH of the catalyst solution, the rpm at which the impeller turned, the pressure difference between the reactor standpipe and the atmosphere and the temperature of the off-gas stream were all monitored. Gas analysis for hydrogen sulfide and methanethiol concentrations were effected for reactor feed and exit streams.

The separate runs were effected and the results obtained are summarized in the following Tables III and IV separately:

TABLE III

| Time | pH | rpm | ΔP "H$_2$O | T °C. | H$_2$S$_{IN}$ ppmv | H$_2$S$_{OUT}$ ppmv | Q L/Min |
|---|---|---|---|---|---|---|---|
| 11:20 | 8.5 | 2120 | −7.6 | 33 | 900 | — | 26 |
| 12:00 | 8.9 | 1810 | −6.8 | 30 | 150 | <0.1 | 20 |
| 13:00 | 8.9 | 2060 | −7.6 | 30 | 33 | — | 25 |
| 14:00 | 8.7 | 2190 | −8.2 | 37 | 550 | <0.1 | 28 |
| 15:00 | 8.8 | 2020 | −9.8 | 40 | 85 | <0.1 | 31 |
| 16:00 | 8.7 | 2060 | −7.6 | 37 | 1400 | <0.1 | 25 |
| 17:00 | 8.5 | 2370 | −8.2 | 50 | 700 | <0.1 | 30 |

TABLE IV

| Time | pH | rpm | ΔP "H$_2$O | T °C. | H$_2$S$_{IN}$ ppmv | H$_2$S$_{OUT}$ ppmv | Q L/Min |
|---|---|---|---|---|---|---|---|
| 10:10 | 9.0 | 2230 | −9.2 | 36 | — | — | 32 |
| 11:00 | 8.8 | 2200 | −8.5 | 44 | 1100 | <0.1 | 30 |
| 12:00 | 8.6 | 2200 | −8.4 | 45 | 2000 | <0.1 | 29 |
| 13:00 | 8.6 | 2200 | −8.7 | 48 | 7500 | <0.1 | 30 |
| 14:00 | 8.7 | 2209 | −8.5 | 49 | 250 | <0.1 | 30 |
| 15:00 | 8.4 | 2270 | −7.4 | 46 | 200 | <0.1 | 27 |
| 16:00 | 8.3 | 2300 | −8.2 | 48 | 1400 | <0.1 | 29 |
| 17:00 | 8.5 | 2320 | −7.2 | 40 | 85 | <0.1 | 25 |

In these Tables, the following abbreviations are used:
pH: of the catalyst solution
rpm: of the reactor impeller
ΔP: pressure difference between the reactor stand-pipe and the atmosphere ("H$_2$O)
T: temperature of the slip-stream at the point where it is removed from the feather cooker off-gas (°C.)
H$_2$S$_{IN}$: the hydrogen sulphide concentration in the reactor feed gas stream (ppmv)
H$_2$S$_{OUT}$: the hydrogen sulphide concentration in the reactor exit gas stream (ppmv)
Q: the volumetric flow rate of the reactor feed gas stream (L/min)

During the Table III run, the methanethiol concentration was measured at 14:00 in the reactor inlet and outlet gas streams at 8 ppmv and <0.1 pmv respectively. When the reactor was stopped at 17:15, the pH of the catalyst solution was 8.5 and the pressure inside the off-gas duct was −3.2 "H$_2$O.

During the Table IV run, the methanethiol concentration was measured at 12:00 in the reactor inlet and outlet gas streams at 5 ppmv and <0.1 ppmv respectively. When the reactor was stopped at 17:00, the pressure inside the off-gas pipe was −5.4 "H$_2$O.

After approximately 20 minutes of operation from start-up of the Table III run, sulfur particles clouded the catalyst solution and after about one hour a froth layer of elemental sulfur developed on the surface of the catalyst solution. During the two runs, no sulfur was removed from the reactor during the runs except for sulfur suspended in solution when catalyst samples were withdrawn from the reactor. The sulfur particles increased in size as the tests proceeded as observed by the length of time required for the sulfur particles to settle in the catalyst sample removed from the reactor.

As can be seen from the results set forth in Tables III and IV, a variable feed concentration of hydrogen sulfide was decreased to below the limit of detection of the test equipment (0.1 ppmv) as well as decreasing the methanethiol concentration below the level of detection of the test equipment (0.1 ppmv).

The highly odiferous off-gas stream contained a variety of nitrogenous and sulfurous organic compounds, in addition to hydrogen sulfide. These compounds which included the methanethiol, were removed from the gas stream by adsorption by the sulfur froth and the only detectable odor in the exit gas stream from the reactor was that of ammonia. This latter observation was confirmed by chromatographic analysis of the inlet and outlet streams, which showed a variety of compounds besides hydrogen sulfide in the gas stream entering the reactor which were absent from the exiting gas stream.

Example 7

The apparatus described in Example 3 was operated to test the mass transfer of oxygen from gas phase to liquid phase by employing a readily oxidizable component dissolved in the liquid phase, namely sodium sulfite.

In this procedure, the apparatus first was operated for 10 minutes in the absence of sodium sulfite and the power requirement (P), standpipe pressure (ΔP$_s$), gas flow rate (Q$_g$) and quiecsent water level (L$_s$) after shutdown (to determine liquid volume V$_L$) were measured. The sodium sulfite was added and the reactor operated until a non-zero dissolved oxygen concentration was detected, signifying that the sodium sulfite had been consumed.

From the latter time (t), the K$_{la}$, i.e. the mass transfer coefficient, may be determined from the relationship:

$$\Delta C \cdot K_{la} \cdot V \cdot t = \text{consumed oxygen in Kg}$$

where ΔC is determined from the equilibrium dissolved oxygen level after completion of the run. ΔC=Ce−O where Ce is the equilibrium oxygen concentration in the liquid phase.

These runs have been performed, as summarized in the following Table V:

TABLE V

| | Q$_g$ (CFM) | ΔP$_s$ ("H$_2$O) | P (HP) | L$_g$ (mm) | Ce (mg/l) | t (secs) | K$_{la}$ (hr$^{-1}$) |
|---|---|---|---|---|---|---|---|
| Run No. 1 | 178 | 0 | 13.8 | 576 (1.07M$^3$) | 8.6 | 59.2 | 1340 |
| Run No. 2 | 374 | 4.5 | 8.0 | 484 (0.837M$^3$) | 8.6 | 61.2 | 1300 |
| Run No. 3 | 553 | 4.5 | 7.5 | 463 (0.799M$^3$) | 8.6 | 53.8 | 1480 |

As may be seen from these results high levels of mass transfer were observed for different flow rates of air to the reactor.

SUMMARY OF DISCLOSURE

In summary of this disclosure, the present invention provides novel method and apparatus for effecting gas-liquid contact for distribution of a gaseous phase in a liquid phase, particularly for the removal of components from gas streams, such as by chemical reactions or physical separation and, if desired, for separating flotable by-products of such reactions using an agitated flotation cell, modified in certain critical respects to function as an efficient gas-liquid contactor. Modifications are possible within the scope of this invention.

What we claim is:

1. A method for the distribution of a gaseous phase in a liquid phase, which comprises:

providing a rotary impeller comprising a plurality of blades at a submerged location in said liquid phase surrounded by a shroud through which are formed a plurality of openings, feeding said gaseous phase to said submerged location, rotating said impeller about a substantially vertical axis at a speed corresponding to a blade tip velocity of at least about 350 in/sec so as to draw liquid phase into the interior of the shroud and to generate sufficient shear forces between said impeller and said plurality of openings in said shroud to distribute said gaseous phase as fine bubbles in said liquid phase to the interior of said shroud and to effect intimate contact of said gaseous phase and said liquid phase at said submerged location so as to form a gas-liquid mixture of fine bubbles of said gaseous phase in said liquid phase contained within said shroud, flowing said gas-liquid mixture of fine bubbles of gaseous phase and liquid phase from interior of said shroud through and in contact with said openings to external of said shroud at a gas velocity index (GVI) of at least about 18 per second per opening in said shroud so as to effect further shearing of the fine gas bubbles and further intimate contact of said gaseous phase and said liquid phase, said gas velocity index being the ratio of the linear velocity (V) of the gaseous phase through each opening and the equivalent diameter (d) of the opening, as determined by the expression:

$$GVI = V/d$$

where d is determined for each opening by the expression:

$$d = 4A/P$$

where A is the area of the opening and P is the length of the perimeter of the opening.

2. The method of claim 1 wherein said blade tip velocity is about 500 to about 700 in/sec.

3. The method of claim 1 wherein said gas velocity index is at least 24 per second per opening.

4. The method of claim 2 wherein said gas velocity index is from about 30 to about 400 per second per opening.

5. The method of claim 1 wherein said rotation of said impeller is effected at such a speed and said flow through and in contact with said shroud openings is effected at such a gas velocity index that a substantial majority of said fine bubbles exiting said shroud openings are dimensioned less than about 1 mm.

6. The method of claim 1 wherein said fine gas bubbles and liquid medium are flowed from the interior of the shroud through the openings to an annular flow path out of fluid flow communication with a body of said liquid phase except at the lower and upper extremity thereof.

7. The method of claim 1 wherein said fine gas bubbles and liquid medium are flowed from the interior of the shroud through the openings directly into a body of said liquid phase surrounding said shroud.

8. The method of claim 1 wherein said liquid phase contains an-undesired oxidizable dissolved component and said gaseous phase comprises oxygen, so as to remove said dissolved component from said liquid phase.

9. The method of claim 8 wherein said liquid phase comprises waste water and said undesired dissolved component comprises BOD and/or COD material.

* * * * *